United States Patent
Chen et al.

(10) Patent No.: US 8,940,244 B2
(45) Date of Patent: Jan. 27, 2015

(54) HIGH THERMAL STABLE HOLLOW MESOPOROUS NANOTUBES, PREPARATION AND APPLICATION FOR THE SAME

(71) Applicant: National Tsing Hua University, Hsinchu (TW)

(72) Inventors: Hsueh-Shih Chen, Hsinchu (TW); Po-Hsun Chen, Hsinchu (TW); Jeng Liang Kuo, Hsinchu (TW); Tsong-Pyng Perng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 112 days.

(21) Appl. No.: 13/717,177

(22) Filed: Dec. 17, 2012

(65) Prior Publication Data
US 2013/0171033 A1 Jul. 4, 2013

(30) Foreign Application Priority Data
Dec. 30, 2011 (TW) .............................. 100150011 A

(51) Int. Cl.
*B01J 23/42* (2006.01)
*B01J 32/00* (2006.01)
(Continued)

(52) U.S. Cl.
CPC *B01J 23/42* (2013.01); *B01J 32/00* (2013.01); *B01J 8/00* (2013.01); *B01J 19/123* (2013.01); *B01J 19/127* (2013.01); *B01J 37/0238* (2013.01); *B01J 37/08* (2013.01); *B01J 37/082* (2013.01); *B01J 23/06* (2013.01); *B01J 23/34* (2013.01); *B01J 23/44* (2013.01); *B01J 23/464* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 27/02* (2013.01); *B01J 27/10* (2013.01); *B01J 27/12* (2013.01); *B01J 27/14* (2013.01); *B01J 27/20* (2013.01); *B01J 27/24* (2013.01); *B01J 29/0325* (2013.01); *B01J 37/0018* (2013.01); *Y10S 977/734* (2013.01); *Y10S 977/89* (2013.01); *Y10S 977/762* (2013.01); *Y10S 977/902* (2013.01); *B82Y 30/00* (2013.01); *B01J 2219/0877* (2013.01); *B01J 2219/0892* (2013.01); *B01J 21/04* (2013.01); *B01J 21/063* (2013.01); *B01J 23/08* (2013.01); *B01J 23/14* (2013.01); *B82Y 40/00* (2013.01);
(Continued)

(58) Field of Classification Search
USPC .......................... 422/222; 977/754, 712, 715
See application file for complete search history.

(56) References Cited

U.S. PATENT DOCUMENTS 7,011,737 B2 * 3/2006 Varghese et al. .............. 205/189
2009/0068461 A1 * 3/2009 Reneker et al. ............... 428/366

*Primary Examiner* — Lessanework Seifu
(74) *Attorney, Agent, or Firm* — Muncy, Geissler, Olds & Lowe, P.C.

(57) ABSTRACT

The present invention relates to hierarchical structured nanotubes, to a method for preparing the same and to an application for the same, wherein the nanotubes include a plurality of connecting nanotubes for constituting a three-dimensional multi-dendrite morphology; and the method includes the following steps: (A) providing a polymer template including a plurality of organic nanowires; (B) forming an inorganic layer on the surface of the organic nanowires in the polymer template; and (C) performing a heat treatment on the polymer template having the inorganic layer on the surface so that partial atoms of the organic nanowires enter the inorganic layer.

35 Claims, 14 Drawing Sheets

(51) Int. Cl.

| | |
|---|---|
| *B01J 19/12* | (2006.01) |
| *B01J 8/00* | (2006.01) |
| *B01J 37/02* | (2006.01) |
| *B01J 37/08* | (2006.01) |
| *B01J 23/06* | (2006.01) |
| *B01J 23/34* | (2006.01) |
| *B01J 23/44* | (2006.01) |
| *B01J 23/46* | (2006.01) |
| *B01J 23/50* | (2006.01) |
| *B01J 23/52* | (2006.01) |
| *B01J 23/72* | (2006.01) |
| *B01J 23/745* | (2006.01) |
| *B01J 23/75* | (2006.01) |
| *B01J 23/755* | (2006.01) |
| *B01J 27/02* | (2006.01) |
| *B01J 27/10* | (2006.01) |
| *B01J 27/12* | (2006.01) |
| *B01J 27/14* | (2006.01) |
| *B01J 27/20* | (2006.01) |
| *B01J 27/24* | (2006.01) |
| *B01J 29/03* | (2006.01) |
| *B01J 37/00* | (2006.01) |
| B82Y 30/00 | (2011.01) |
| B01J 21/04 | (2006.01) |
| B01J 21/06 | (2006.01) |
| B01J 23/08 | (2006.01) |
| B01J 23/14 | (2006.01) |
| B82Y 40/00 | (2011.01) |

(52) U.S. Cl.
CPC ......... *C02F 2305/08* (2013.01); *C02F 2305/10* (2013.01); *Y10S 977/715* (2013.01); *Y10S 977/742* (2013.01); *Y10S 977/754* (2013.01); *Y10S 977/81* (2013.01)
USPC ........ 422/186.3; 422/186; 422/211; 422/222; 977/715; 977/742; 977/754; 977/810; 977/890; 977/902; 977/734; 977/762

HIGH THERMAL STABLE HOLLOW MESOPOROUS NANOTUBES, PREPARATION AND APPLICATION FOR THE SAME

BACKGROUND OF THE INVENTION

1. Field of the Invention

This invention relates generally to a mesoporous hierarchical structured nanotubes, preparation method and application thereof. More specifically, the present invention relates to a synthetic method of and industrial application of a high thermal stable mesoporous hierarchical nanotube structure obtained by mixing inorganic fiber—organic oxide materials.

2. Description of Related Art

The development of nanotubes is an active area of research across the globe with regard to nanometer-scale composite material research. There is a constant and growing interest within the international academic research community and commercial plastics companies to study the related applicability of nanotubes in various settings. As for the current domestic state of technological development, the nanometer-scale composite material technology has been utilized extensively as an alternative to plasticizer in electro-optical industry, traditional manufacturing, or elementary industry.

It is well known to the people with ordinary skills in the art that the scope of applicability for nanotubes can be expanded further by intertwining several inorganic materials (e.g. titanium dioxide, aluminum oxide, or other oxide compounds) into nanometer-scale structures. For example, titanium dioxide, a desirable photocatalyst, was first synthesized in the titanium dioxide nanotube form in 1996 and found its particular applicability in medical technology (e.g. bacteria sanitation, or virus termination). Furthermore, titanium dioxide nanoparticles or nanotubes may be used to act as excellent photoelectric conversion material. Also, the material that is produced from various composite materials for use as a filtering agent or reactive agent may be utilized in appropriate applications, including but not limited to water purification, seawater desalination, flue gas treatment, gas reformulation and dialysis equipment. It can thus be observed as in facts that the current state of technology of nanomaterials is closely related.

There is arguably a variety of manufacturing methods for producing nanotubes. For example, a well known art combines solid polymeric fiber prepared by electrospinning (using it as a template) with atomic layer deposition (ALD) to deposit oxides on the template. The step following this is to use high temperature to eliminate polymers to obtain a hollow fiber structure, wherein the wall of the hollow fiber is solid and contains no porous composition. Nevertheless, the homogeneity of the inorganic layer prepared by a sol-gel method turns to be of less desirability, and exhibits low thermal stability.

A defining characteristic feature of a nanotube is its large surface area. Accordingly, the present invention will provide a hollow hierarchical structured nanotube that has a large surface area, high homogeneity, and high thermal stability for use in enhancing effects in filtration, hydrogen production, photodegradation, or other chemical reactions.

SUMMARY OF THE INVENTION

It is an object of the present invention to provide a mesoporous hierarchical structured nanotube and a synthetic method thereof, thereby providing an improved means for producing a mesoporous nanotube comprising a hierarchical structure. The nanotube disclosed herein each comprises mesoporous nanoscale channels, where the nanoscale channels interconnected with each other to form a three dimensional multi-dendrite morphology, which thereby operates to improve large-surface-area properties and a nanospace-confined scheme.

In order to achieve the abovementioned object, the present invention provides a hierarchical nanotube, comprising a plurality of interconnecting nanotubes, which constitutes a three-dimensional multi-dendrite morphology; wherein the cross-diameter of each nanotube is between about 1 nm-1 µm; the nanotube is made by a material selected from a group consisting of: metal oxide, semiconductor material, metal, ceramics, and any combination thereof; the nanotube is doped with at least an element selected from the group consisting of: oxygen, sulfur, carbon, nitrogen, silicon, selenium, phosphorus, fluorine, chlorine, and any combination thereof.

In one embodiment of the present invention, the plurality of interconnecting nanotubes is preferably to further include a polymeric nanowire, wherein the polymeric nanowire is made from a material selected from the group consisting of: polysulfone, plyvinylpyrrolidone, polysulfone, polytetrafluorcethylene, polyoxybenzylene, polyphenylene sulfide, polyarylate, and any combination thereof.

In another embodiment of the present invention, the hierarchical structured nanotube is preferred to be visible-light-absorbing and UV-light-absorbing.

In the context of the present invention, the composition constituting the nanotube may be represented according to the following general formula 1:

$$TiO_2S_xO_yN_nC_z \quad (1), \text{ wherein } 0 \leq m \leq 2, 0 \leq x \leq 2, 0 \leq y \leq 10, 0 \leq n \leq 2, 0 \leq z \leq 20.$$

In a preferred embodiment of the present invention, the general formula (1) can be expressed as $TiO_2S_{0.013}O_{2.89}N_{0.05}C_{6.29}$.

In another preferred embodiment, the thickness of the nanotube is 1 nm-1 µm.

In yet another embodiment of the present invention, the metal oxide is selected from a group consisting of titanium oxide, aluminum oxide, zinc oxide, silicon oxide, cupric oxide, nickel oxide, ferric oxide, cobalt oxide, tin oxide, gallium oxide, germanium oxide, and any combination thereof.

In another preferred embodiment of the present invention, a surface of the nanotube further includes a plurality of catalyst particles. The catalyst particle may be produced by atomic layer deposition, chemical vapor deposition, or chemical solution deposition. The catalyst particle is selected from a group consisting of platinum, rhodium, silver, gold, iron, cobalt, nickel, copper, manganese, palladium, and any Period 4, 5, 6 transition metal.

In accordance with an aspect of the present invention, there is provided a method for manufacturing a hierarchical structured nanotube, comprising the steps, of (A) providing a polymeric template wherein the polymeric template includes a plurality of organic polymeric nanowires; (B) forming an inorganic layer over a surface of the plurality of organic polymeric nanowires of the polymeric template; and (C) thermal heating the surface to form the polymeric template having the inorganic layer so as to permit a portion of atoms of the organic polymeric nanowire to migrate into the inorganic layer. In other words, the plurality of organic polymeric nanowires of the polymeric template may undergo a physical or chemical mixing to form.

In a further embodiment of the present invention, the thermal heating of the step (C) may remove the plurality of organic polymeric nanowires of the polymeric template, and consequently reveal the inorganic layer.

In an embodiment of the present invention, the nanowire is made by a material selected from the group consisting of a copolymer of polysulfone and polyvinylpyrrolidone, polysulfone, polytetrafluorcethylene, polyoxybenzylene, polyphenylene sulfide, polyarylate, and any combination thereof. In one aspect of the present invention, the diameter of the polymeric nanowire may be between 1 nm-5 μm, which, in one preferred embodiment is between 5 nm-1 μm. Furthermore, the template is a mold, ingot mold, or a cavity, and there is no limitation on its shape, for which it may be of a shape selected from a group consisting of needle, spindle, block, flake, and any combination thereof. In one particular embodiment, the polymeric template may be a positive electrode aluminum oxide template.

In a further embodiment of the present invention, wherein in step (B) the inorganic material layer is formed over the surface of the plurality of organic polymeric nanowires of the polymeric template through use of atomic layer deposition (ALD) or a solution method. The preferred embodiment may use atomic layer deposition in order to form an inorganic material layer with improved homogeneity.

In another embodiment of the present invention, wherein in step (B), the inorganic material layer is selected from the group consisting of metal oxide, semiconductor material, metal, ceramic, and any combination thereof.

In yet another embodiment of the present invention, the metal oxide is selected from a group consisting of titanium oxide, aluminum oxide, zinc oxide, silicon oxide, cupric oxide, nickel oxide, ferric oxide, cobalt oxide, tin oxide, gallium oxide, germanium oxide, and any combination thereof.

In another embodiment of the present invention, wherein in step (B), the thickness of the inorganic material layer is between 1 nm-1 μm. In yet another embodiment of the present invention, wherein a further step (A1) is selectively added following the step (A): comprising executing surface modification on the polymeric template so as to render the plurality of organic polymeric nanowires of the polymeric template hydrophilic. For example, the surface of polymeric nanowires may be made hydrophilic through doping hydrophilic materials, acid treatment, or oxygen plasma treatment, thereby making the surface of the polymeric nanowire hydrophilic.

In another embodiment of the present invention, wherein in step (C), the thermal heating is at from about 50° C. to about 1600° C. Heating the surface to form inorganic material layer on a polymeric template to allow the pluarlity of organic polymeric nanowires and inorganic material layer to mix chemically or physically may cause a portion of the atoms of the organic polymeric nanowires to enter the inorganic material layer, or minimize the volumetric layer constituted by the pluarlity of organic polymeric nanowires of the polymeric template. In addition, step (C) can also occur at the same time during the inorganic material layer formation process (i.e. step (B)). When the thermal treatment temperature falls between 50° C.-300° C., the polymeric nanowires can hold out to remain within the nanotubes to provide structural support. When the thermal treatment temperature operates between 300° C.-1600° C., the polymeric nanowires will be burned out and removed, while a portion of atoms will enter the inorganic layer.

In yet another embodiment of the present invention, wherein in step (C), the thermal heating lasts for about 1 minute to about 240 minute. The time duration is preferably 1.5 hours. When the thermal heating time falls insufficiently short, the number of atoms of the polymers entering the inorganic material layer will become inadequate. When the thermal heating time proceeds too long, productivity will decrease.

In another embodiment of the present invention, wherein in step (C), a portion of atoms of the organic polymeric nanowires will enter into the inorganic material layer following a thermal heating process. The portion of atoms may be selected from a group consisting of oxygen, sulfur, carbon, nitrogen, silicon, selenium, phosphorous, fluorine, chlroine, and any combination thereof.

In yet another embodiment of the present invention, the inorganic material layer will appear as white before its going through a thermal heating treatment; otherwise, the inorganic material layer will be brown due to the polymer atoms' entry into the inorganic material layer, transforming the inorganic material layer into one having a material able to absorb visible light.

In a further embodiment of the present invention, wherein following the thermal heating in step (C), the revealed inorganic material layer presents a structure defined by a plurality of interconnecting nanotubes, and the cross-diameter of the nanotube is 1 nm-5 μm.

In another embodiment of the present invention, wherein following the step (C), there comprises an additional step (D): forming a plurality of catalyst particles over a surface of the inorganic material layer, wherein the catalyst particle is selected from a group consisting of platinum, rhodium, silver, gold, iron, cobalt, nickel, copper, manganese, palladium, and any Period 4, 5, 6 transition metal. It will be foreseeable to a person having ordinary skill in the art to use atomic layer deposition (ALD) or solution method to produce the catalyst particles. When the atomic layer deposition is used, the catalyst particles will be less likely to fall off from the surface of the inorganic material layer. The surface of an inorganic material layer is directed to an inner wall or outer wall of the plurally interconnecting nanotubes as formed by inorganic material layer.

It is another object of the present invention to provide a reaction unit apparatus which comprises: a reaction chamber, wherein the reaction chamber has at least one hierarchical structured nanotube; at least one inlet connecting with the reaction chamber; and at least one outlet connecting with the reaction chamber. The apparatus unit is defined in such a way that a fluid enters into the reaction unit apparatus through the inlet, engages in a reaction with at least one hierarchical structured nanotube, and discharges through the outlet.

In an embodiment of the present invention, the at least one hierarchical structured nanotube comprises a plurality of interconnecting nanotubes, wherein the interconnecting nanotubes are arranged to form a three-dimensional multi-dendrite morphology, wherein the cross-sectional diameter of each of said nanotube is from about 1 nm to about 5 μm. The material making up the nanotube can be selected from a group consisting of: metal oxide, semiconductor material, metal, ceramic, and any combination thereof. The nanotube may be doped with at least one atom, the atom can be selected from a group consisting of: oxygen, sulfur, carbon, nitrogen, silicon, selenium, phosphorous, fluorine, chlorine, and any combination thereof.

In another embodiment of the present invention, the plurality of interconnecting nanotubes is preferred to include additionally a polymeric nanowire in which said nanowire is made by a material selected from the group consisting of a copolymer of polysulfone and polyvinylpyrrolidone, polysulfone, polytetrafluorcethylene, polyoxybenzylene, polyphenylene sulfide, polyarylate, and any combination thereof.

In yet another embodiment of the present invention, the reaction unit apparatus further comprises at least one light source for providing a light to shine on the hierarchical structured nanotube, for example, the light source can be a visible light producing lamp or sun light.

In one embodiment of the present invention, the hierarchical structured nanotube is preferred to be a visible-light-absorbing and ultraviolet-light-absorbing hierarchical structured nanotube. Attention is now directed toward a conventional art as an illustrating example. As it is known in the general art, a titanium dioxide based structure can only absorb ultraviolet light in order to act as a photocatalyst. However an advantage of the hierarchical nanotube of the present invention is that the visible-light-absorbing type and ultraviolet-light-absorbing type can both act as a photocatalyst as well. As such the light beam emitting from the light source of the reaction unit apparatus of the present invention can use visible light (preferred wavelength being between 400 nm-700 nm) to induce the hierarchical structured nanotube to act the same (accepted light sources include single visible light, single ultraviolet light, or ultraviolet light plus visible light). In other words, the reaction unit apparatus (or hierarchical structured nanotube) can work to provide a light catalyst with installing additionally an ultraviolet light bulb. In an applied context of a bathroom installment, the present invention provides a disinfection solution upon keeping the lighting equipment turned on.

In view of the present invention, the nanotube constituting the nanotube may be represented according to the following general formula 1:

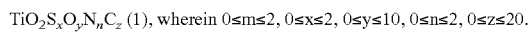

$TiO_2S_xO_yN_nC_z$ (1), wherein $0 \leq m \leq 2$, $0 \leq x \leq 2$, $0 \leq y \leq 10$, $0 \leq n \leq 2$, $0 \leq z \leq 20$.

In a preferred embodiment of the present invention, the general formula (1) can be expressed as $TiO_2S_{0.013}O_{2.89}N_{0.05}C_{6.29}$.

In another preferred embodiment, the thickness of the carbon nanotube is 1 nm-1 μm.

In yet another embodiment of the present invention, the metal oxide is selected from a group consisting of titanium oxide, aluminum oxide, zinc oxide, silicon oxide, cupric oxide, nickel oxide, ferric oxide, cobalt oxide, tin oxide, gallium oxide, germanium oxide, and any combination thereof.

In another preferred embodiment of the present invention, a surface of the nanotube further includes a plurality of catalyst particles. The catalyst particle may be produced by atomic layer deposition, chemical vapor deposition, or chemical solution deposition. The catalyst particle is selected from a group consisting of platinum, rhodium, silver, gold, iron, cobalt, nickel, copper, manganese, palladium, and any Period 4, 5, 6 transition metal.

In accord with the above disclosure, the present invention compounds organic fiber and inorganic oxide to synthesize a hierarchical (structured) mesoporous structure nanotube, so as to formulate a plurality of passage channels of nanoscale structure, and further add on to the nanotubes' passage channel length and surface area. In addition, the hierarchical structured nanotube has high thermal stability (capable of withstanding a temperature of approximately 1000° C.), and features high hydroaffinity, acidity and alkalinity resistance, erosion resistance, and UV resistance, with all demonstrating superior results than nanotube prepared by the prior arts. Furthermore, addition of organic material in the carbon nanotube can help activate the nanotube under visible light.

Other objects, advantages, and novel features of the invention will become more apparent from the following detailed description when taken in conjunction with the accompanying drawings.

BRIEF DESCRIPTION OF THE DRAWINGS

FIG. 2 is a structure diagram illustrating each of the steps recited in FIG. 1, wherein

FIGS. 6A-6D show Scanning Electron Microscope (SEM) images for hierarchical structured titanium oxide nanotube prepared in embodiment 1, wherein, FIG. 6A is for at a temperature below 400° C.; FIG. 6B is for at a temperature below 600° C.; FIG. 6C is for at a temperature below 800° C.; and FIG. 6D is for at a temperature below 1000° C.

DETAILED DESCRIPTION OF THE PREFERRED EMBODIMENT

This disclosure is set forth in the context of representative embodiments that are not intended to be limiting in any way.

Figure 1:
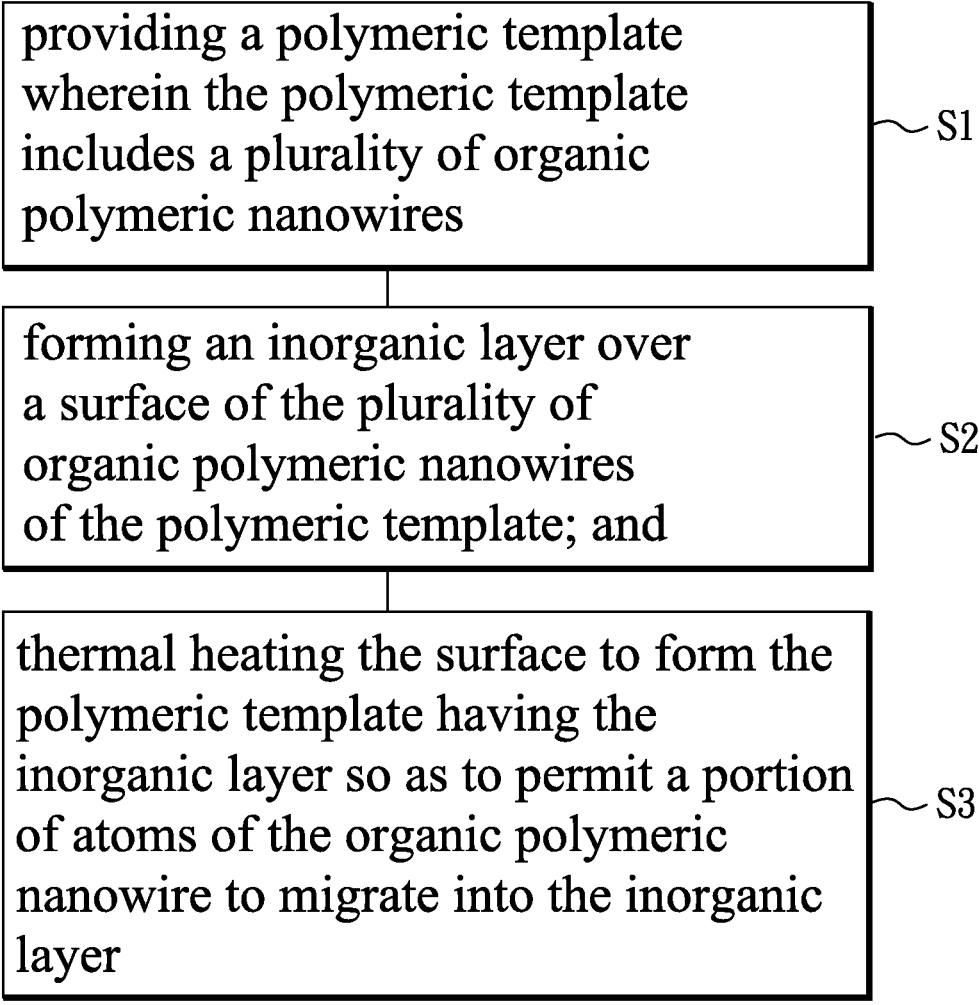
FIG. 1 illustrates a flowchart representative of one embodiment of synthesis method for a hierarchical nanotube of the present invention.
Figure 2A:
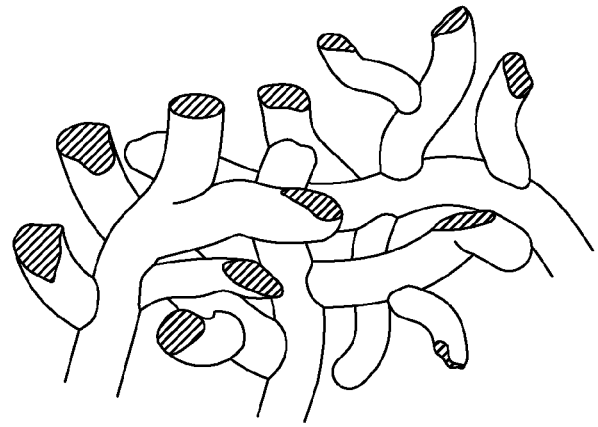
FIG. 2A is a structure diagram for a plurality of organic nanowires.
Figure 2B:
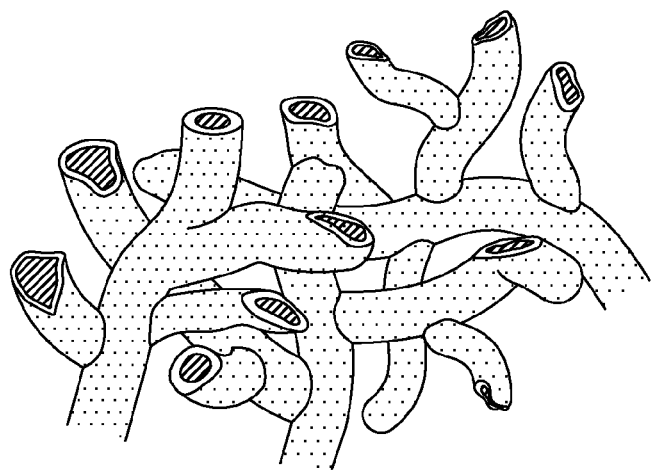
FIG. 2B is a structure diagram for a plurality of organic nanowires covered with an inorganic material layer; and, FIG. 2C is a structure diagram for a revealed inorganic material layer stripped off of organic nanowires, as a result of a thermal treatment.

A representative embodiment of a preparation process of the present invention is depicted in FIG. 1, wherein a preparation method for hierarchical structured nanotubes includes the following steps: (S1) providing a polymeric template wherein the polymeric template includes a plurality of organic polymeric nanowires (as shown in FIG. 2A); (S2) forming an inorganic layer over a surface of the plurality of organic polymeric nanowires of the polymeric template (as shown in FIG. 2B); and (S3) thermal heating the surface to form the polymeric template having the inorganic layer so as to permit a portion of atoms of the organic polymeric nanowire to migrate into the inorganic layer.

Figure 2C:
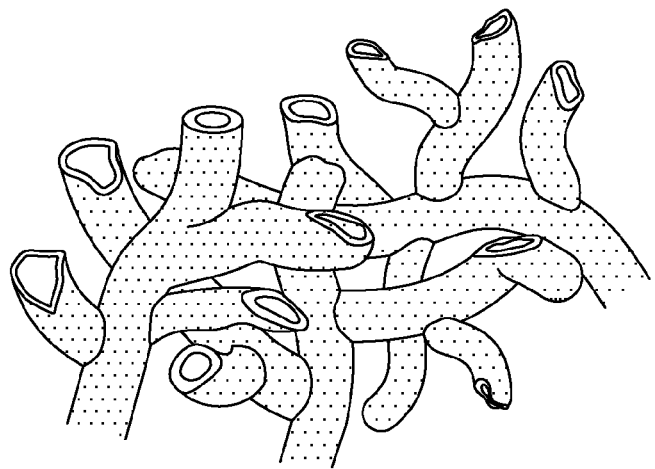

In an alternate embodiment, a thermal treatment (operating at or above 300° C.) is to remove the plurality of organic polymeric nanowires of the polymeric template, and reveal the inorganic layer (as illustrated in FIG. 2C).

Embodiment 1 Hierarchical Structured Titanium Oxide Nanotube

First, an embodiment involves providing a polymeric template, which is consisted of a polysulfone-polyvinylpyrrolidone copolymer, the polymeric template herein includes a plurality of polymeric nanowires, and each of the organic polymeric nanowire has a diameter of 1 nm-5 µm. The next step is performing a surface modification over the polymeric template to render hydrophilic a surface of the plurality of organic polymeric nanowires of the polymeric template. The surface of the polymeric nanowire may be made hydrophilic through doping with hydrophilic materials, treated with acid, or treated with oxygen plasma.

The subsequent step is to form an inorganic material layer over a surface of the plurality of organic polymeric nanowire of the polymeric template. In this embodiment, titanium oxide is used a constituting material for the inroganic material layer, the embodiment also utilizes atomic layer deposition (ALD) to form a surface of the plurality of organic polymeric nanowire of the polymeric template, where the thickness of the thin film is modulated by the system periodicity of the ALD. The titanium oxide layer has a thickness of 20 nm (400 period) where the thickness described therein means the thickness of a carbon nanotube, and the reaction temperature of the ALD system is 25-200° C.

The last step is directed to thermal treating the surface to form a polymeric template having a titanium oxide layer so as to eliminate the plurality of organic nanowire of the polymeric template, and to reveal the titanium oxide layer, the remaining inorganic material layer is organized to form a plurality of interconnecting nanotubes for constituting a three-dimensional multi-dendrite morphology. The operating temperature for the thermal treatment runs between 300° C.-600° C., and the duration of which lasts for 1.5 hours. Furthermore, a major portion of the organic polymeric nanowire will dissociate for removal, while a few atoms (including oxygen, sulfur, nitrogen and carbon etc.) will enter into the inorganic material layer. Accordingly in the present embodiment the inorganic material layer, when coupled with titanium oxide, will be white prior to undergoing heat treatment; when the thermal treatment is done, the inorganic material layer will be brown as a result of the organic ingredients of the polymer entering into the inorganic material layer, rendering the inorganic material layer into visible-light-absorbing.

Figure 3:
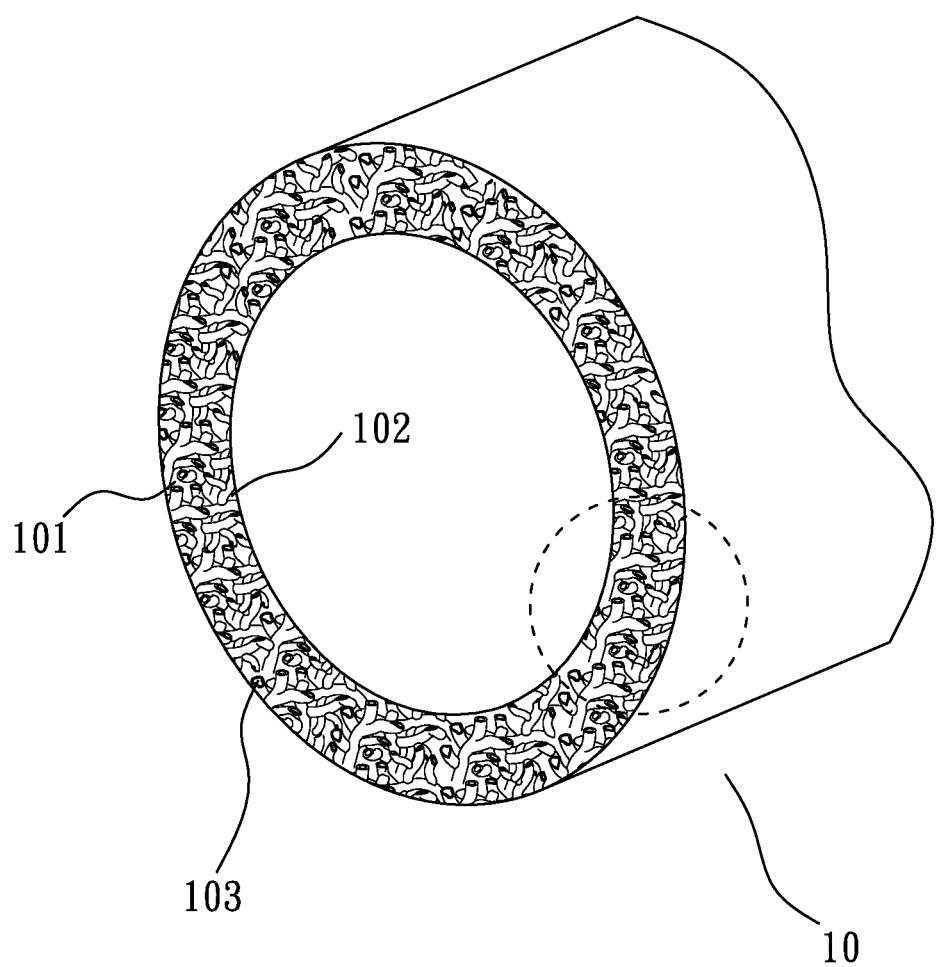
FIG. 3 is a structure diagram exhibiting the hierarchical titanium oxide nanotube as embodied by embodiment 1 of the present invention.
Figure 4:
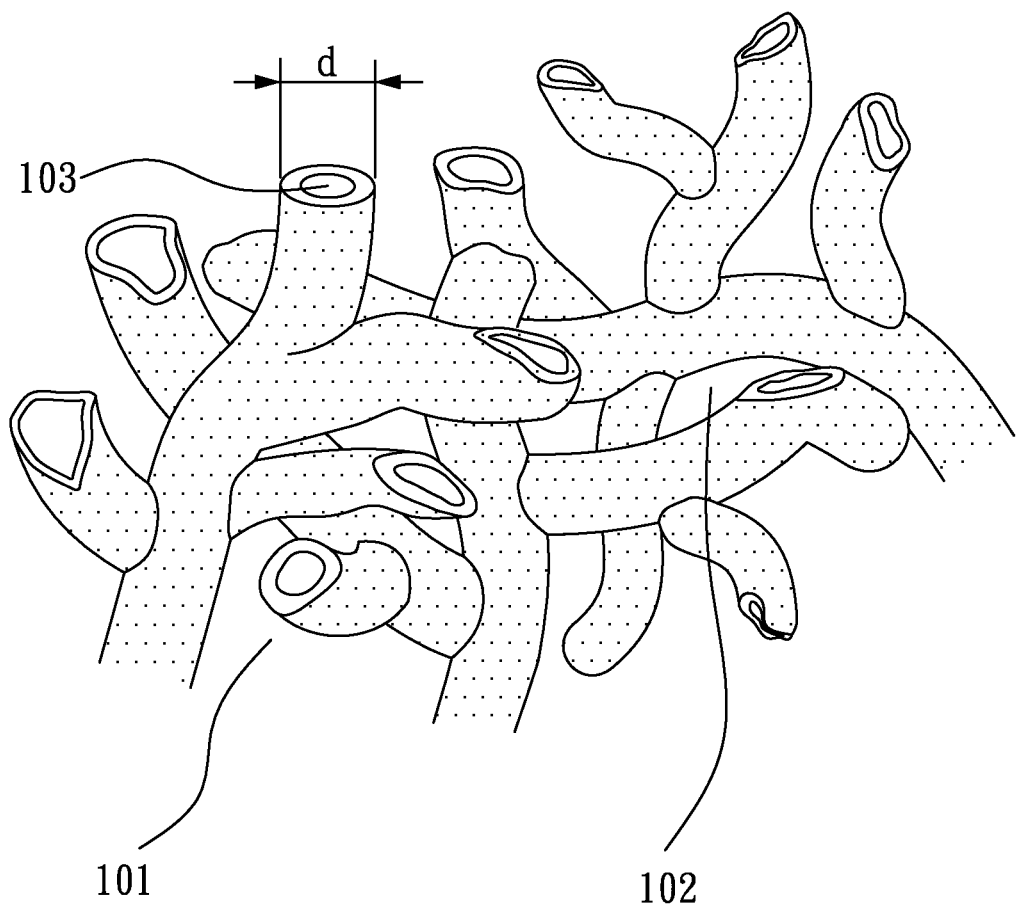
FIG. 4 is a an enlarged view of a mesoporous structure having a three dimensional multi-dendrite morphology, based on a structure diagram showing the hierarchical titanium oxide nanotube (i.e. circled portion in a broken line in FIG. 3) as embodied by embodiment 1.
Figure 5:
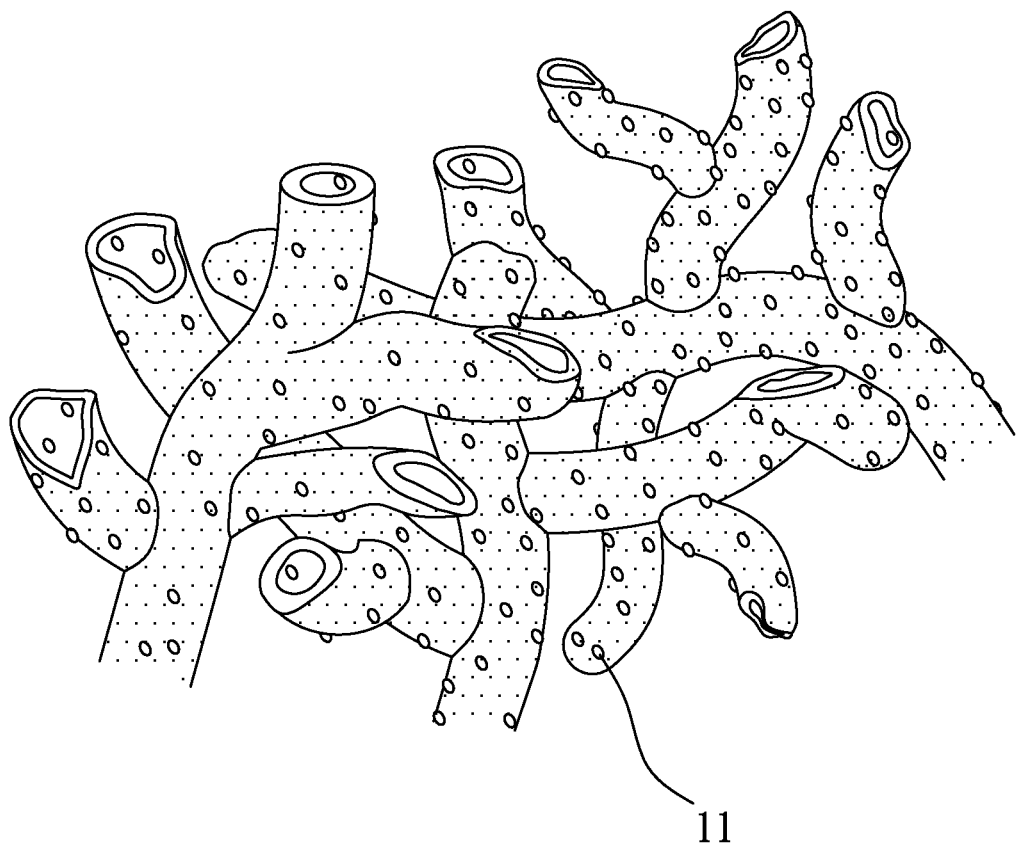
FIG. 5 is a an enlarged view of a mesoporous structure having a three dimensional multi-dendrite morphology, based on a structure diagram showing the hierarchical titanium oxide nanotube (i.e. circled portion in a broken line in FIG. 3) as embodied by embodiment 1, wherein a plurality of catalyst particles attach to a surface of the hierarchical nanotube.

Referring now to FIG. 3, the term "hierarchical" means for those residuals of the inorganic material layer on the wall of the nanotube 10. In particular, the interconnected nanotubes cross-link together to further form pores in between each nanotube. The pore can be classified into at least two classes of passage sizes, a first type of which is a first nanochannel 101 having a pore size of 100 nm-5 µm; a second type is a second nanochannel 102 having a pore size of 1 nm-200 nm (classified by pore size). Further, the above-mentioned nanotube is one with a hollow structure, which is a third nanochannel 103, and the cross diameter of the nanotube is 1 nm-5 µm. An advantage of the embodiment offered by the hierarchical structure of the mesoporous nanochannel is that it can increase channel length and surface area.

Furthermore, a plurality of catalyst particles is disposed over a surface of the inorganic material layer. An embodiment of the present invention uses platinum as the catalyst particle. Of which, the atomic layer deposition (ALD) is used to epitaxially grow platinum catalyst particle over a surface of the inorganic material layer, preventing the platinum catalyst particles from falling off the inorganic material layer too easily. In the present case, the inorganic material layer surface is directed to the inner wall and/or outer wall of the plurality of interconnecting nanotubes of the inorganic material layer.

Figure 6A:
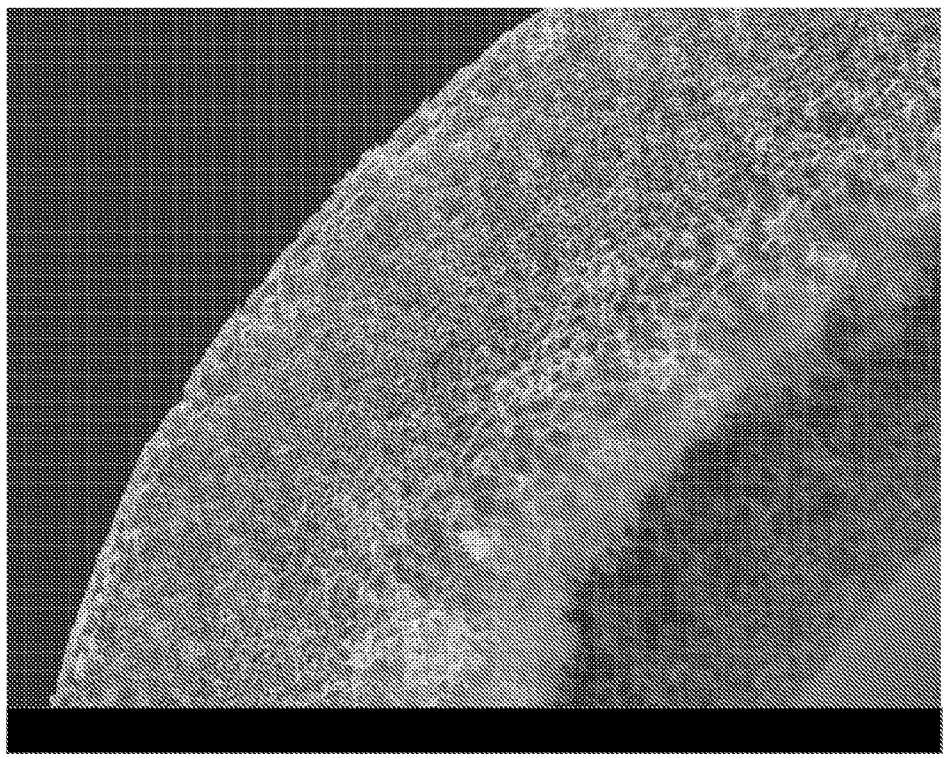
Figure 6B:
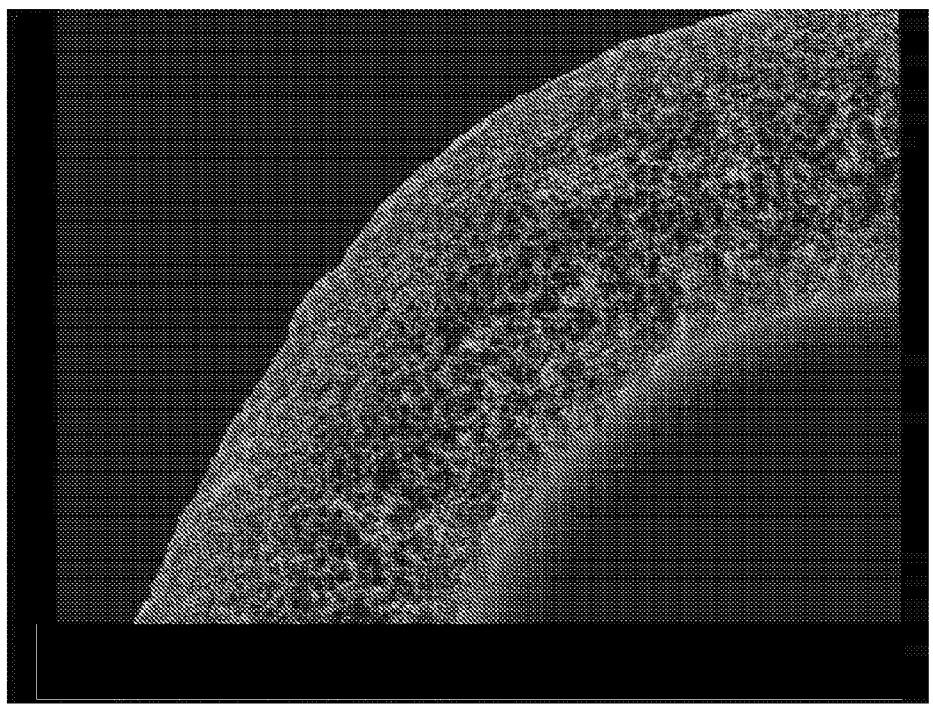
Figure 6C:
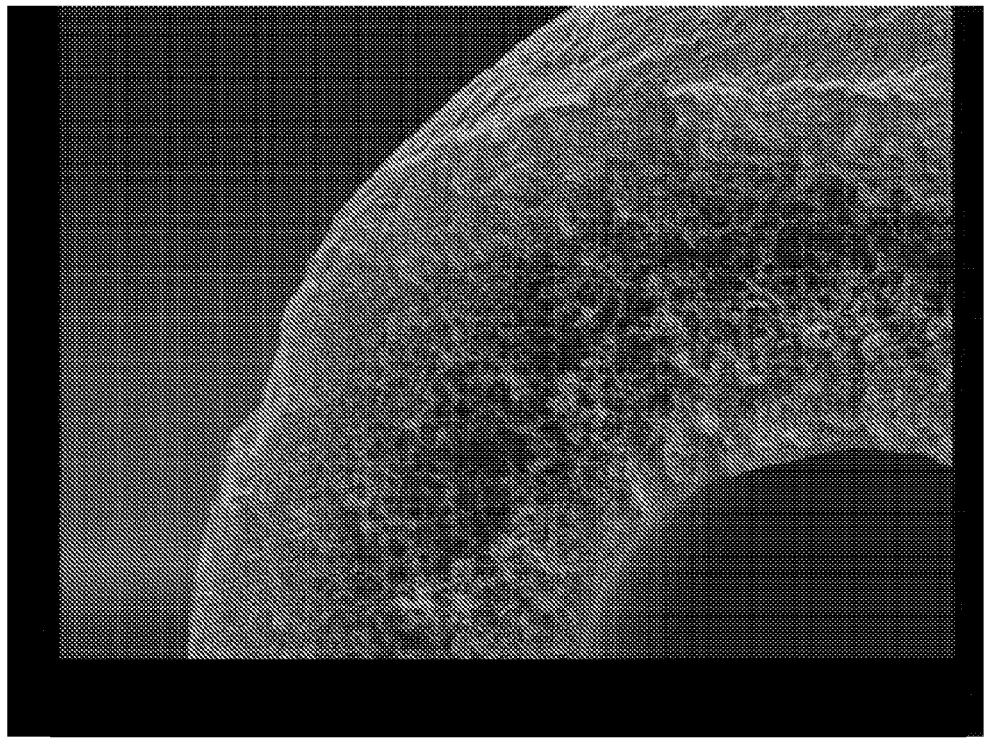
Figure 6D:
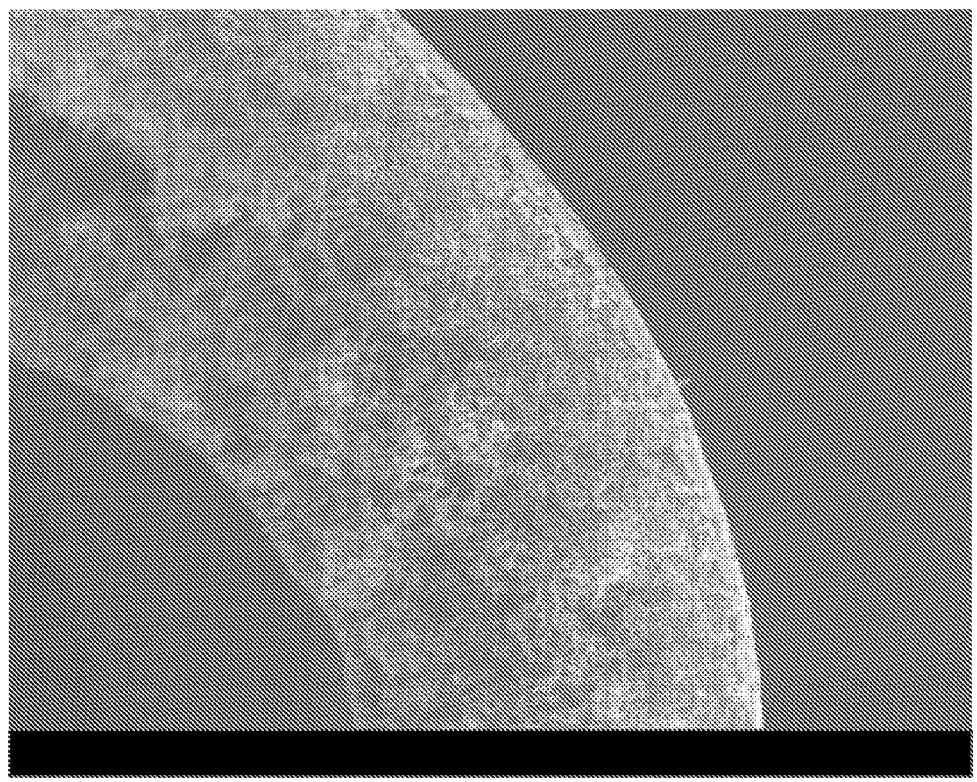
Figure 7A:
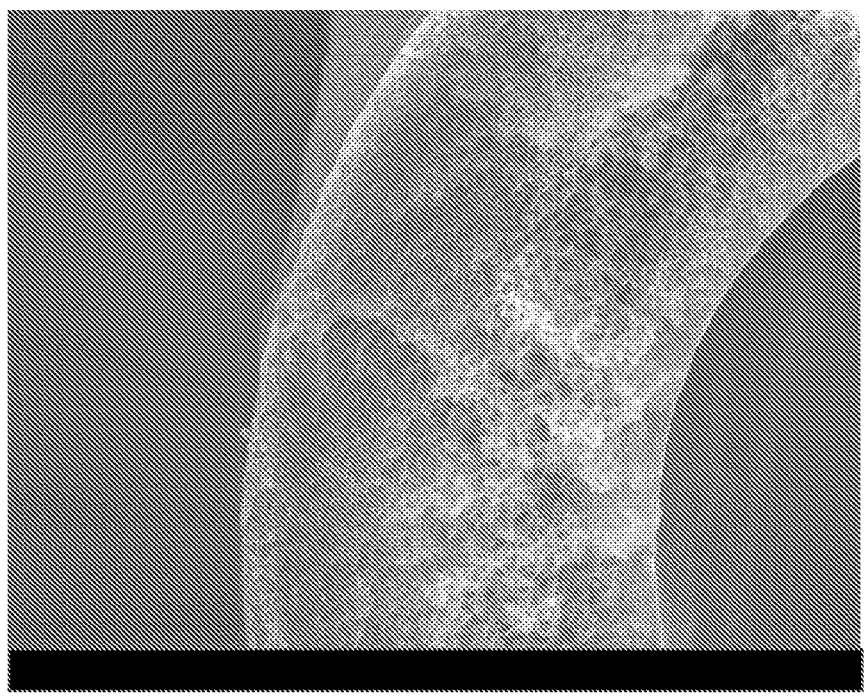
FIGS. 7A-7D show Scanning Electron Microscope (SEM) images for hierarchical structured aluminum oxide nanotube prepared in embodiment 2.
Figure 7B:
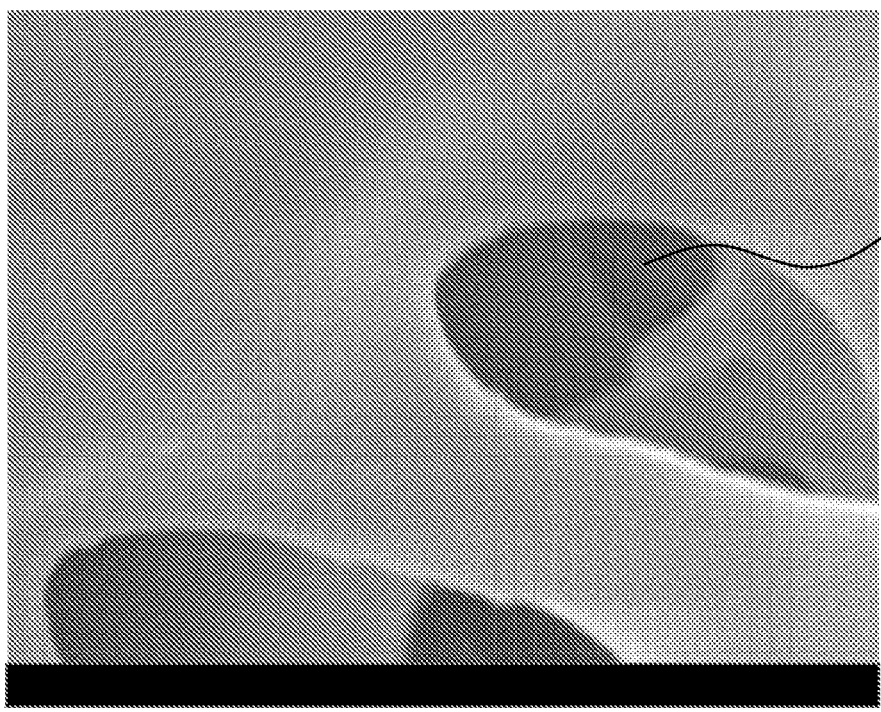
Figure 7C:
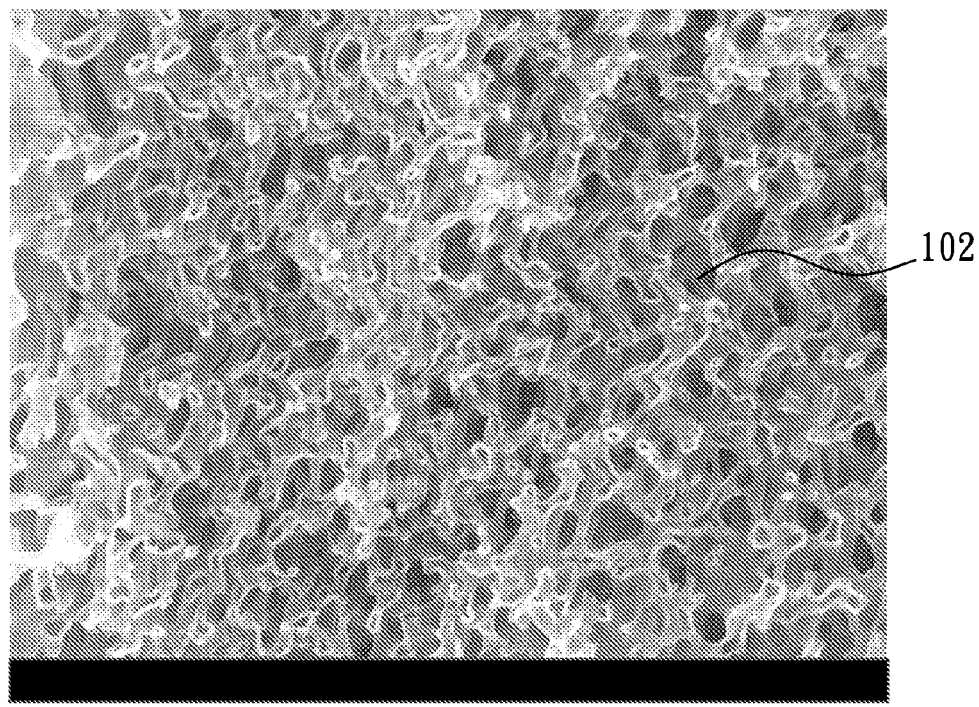
Figure 7D:
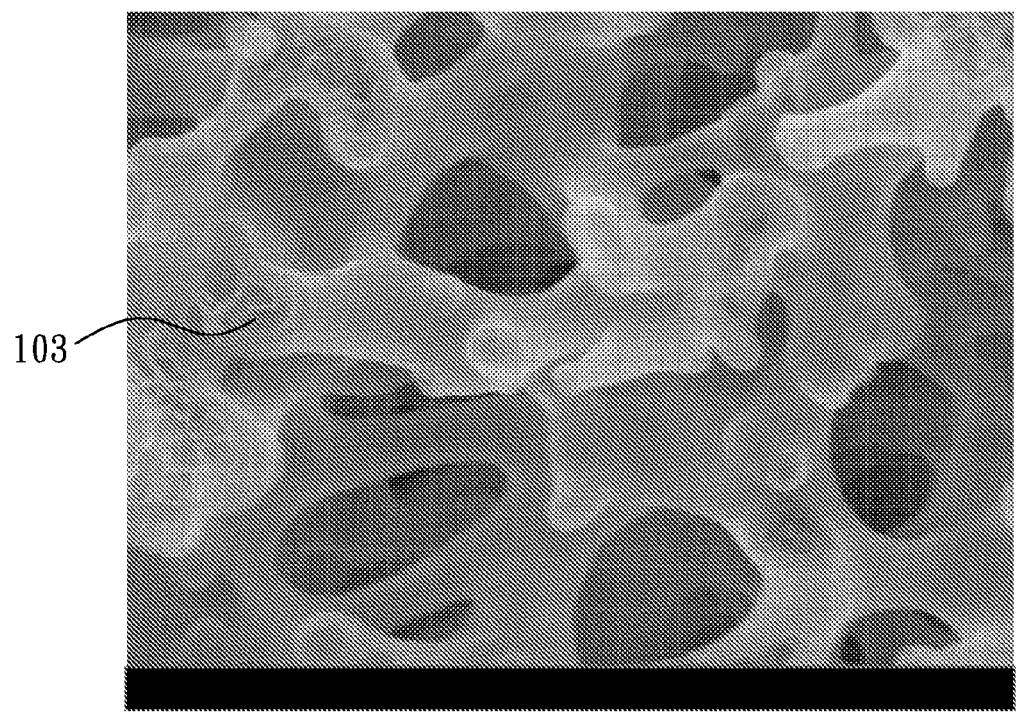

FIGS. 6A-6D show the hierarchical structured titanium oxide nanotube of the present embodiment. As demonstrated by experimental results, the hierarchical structured titanium oxide nanotube will not show signs of calcination and softening while is treated individually at 450° C. (as shown in FIG. 6A), 600° C. (as shown in FIG. 6B), 800° C. (as shown in FIG. 6C), and 1000° C. (as shown in FIG. 6D), Embodiment 2 Hierarchical Aluminum Oxide Nanotube Turning to FIGS. 7A-7D, images of Scanning Electron Microscope (SEM) for hierarchical structured aluminum oxide nanotube prepared in embodiment 2 is provided. The method disclosed in this embodiment is identical as that disclosed in embodiment 1. The difference between them is merely that the inorganic material layer of the present embodiment is aluminum oxide. It will be understood in FIG. 7 that the hierarchical aluminum oxide nanotube of the present embodiment has three types of mesoporous nanochannel structure. FIG. 7B, FIG. 7C, and FIG. 7D each shows the first nanochannel 101, second nanochannel 102, and third nanochannel 103.

Embodiment 3 Hierarchical Zinc Oxide Nanotube

Figure 8A:
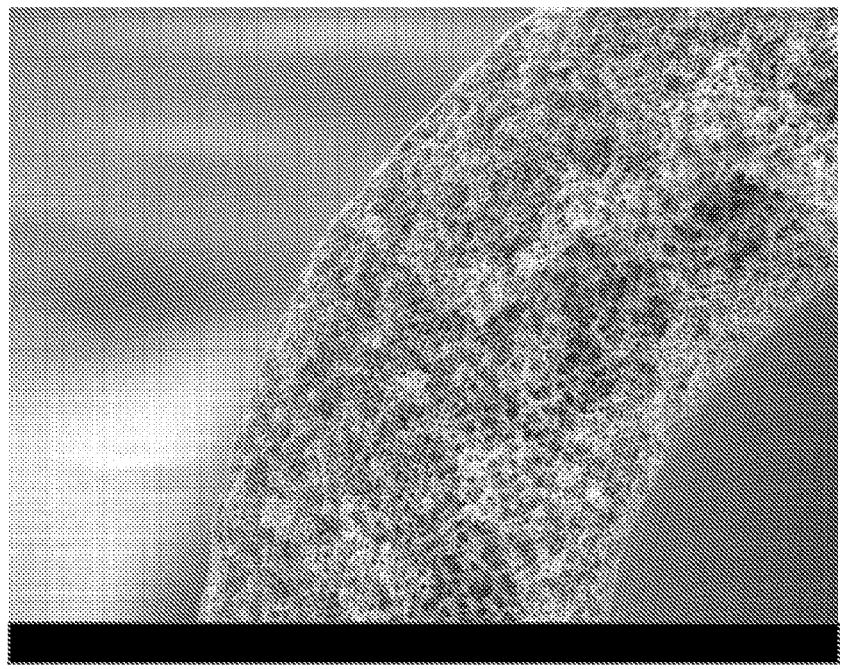
FIGS. 8A-8D show Scanning Electron Microscope (SEM) images for hierarchical structured zinc oxide nanotube prepared in embodiment 3.
Figure 8B:
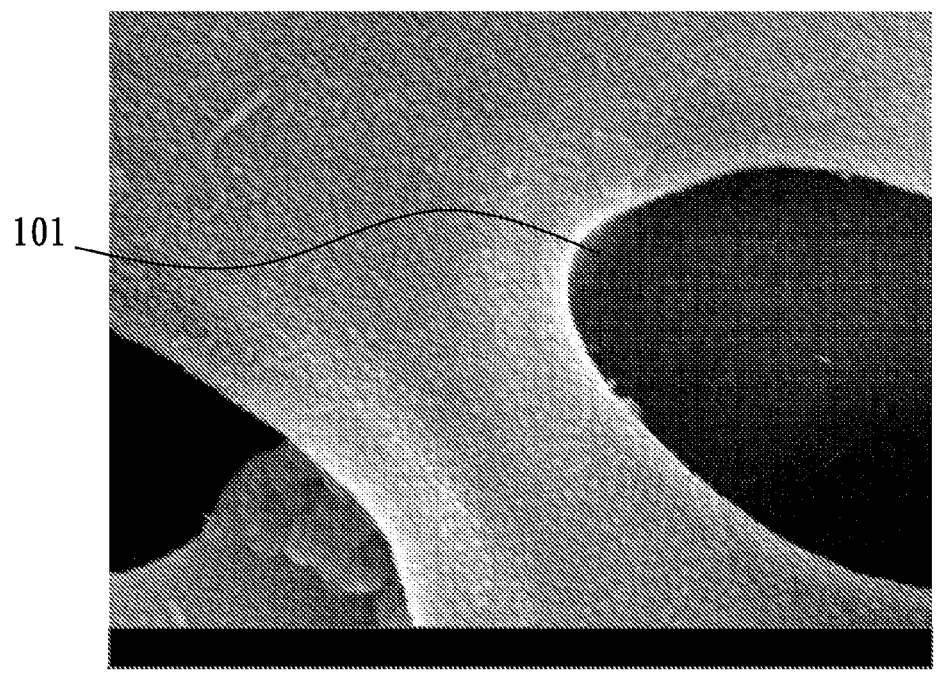
Figure 8C:
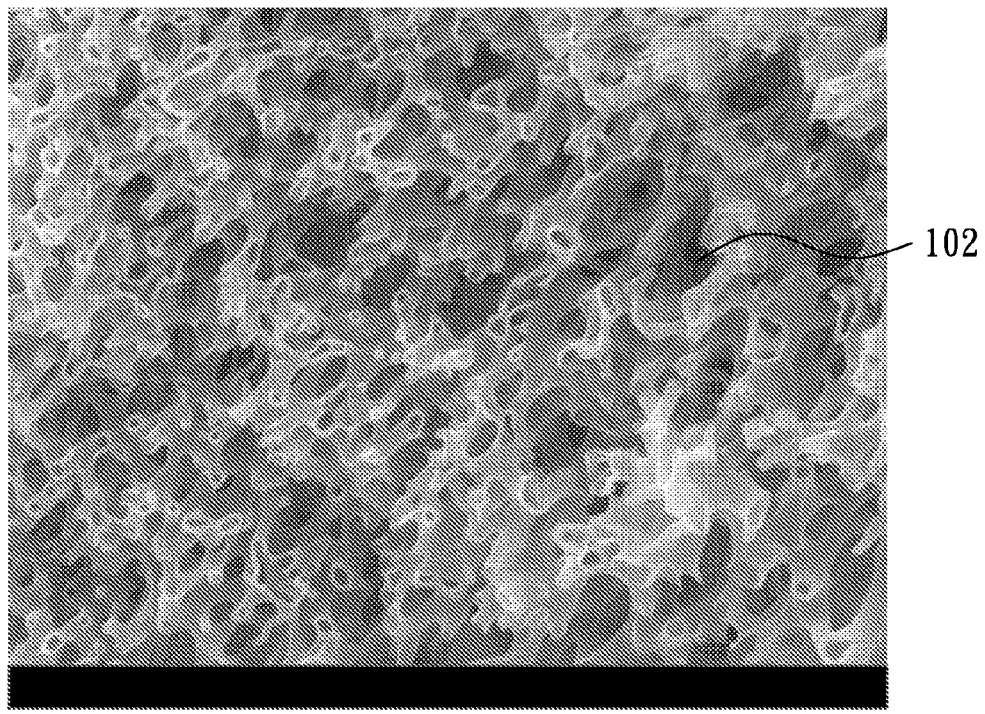
Figure 8D:
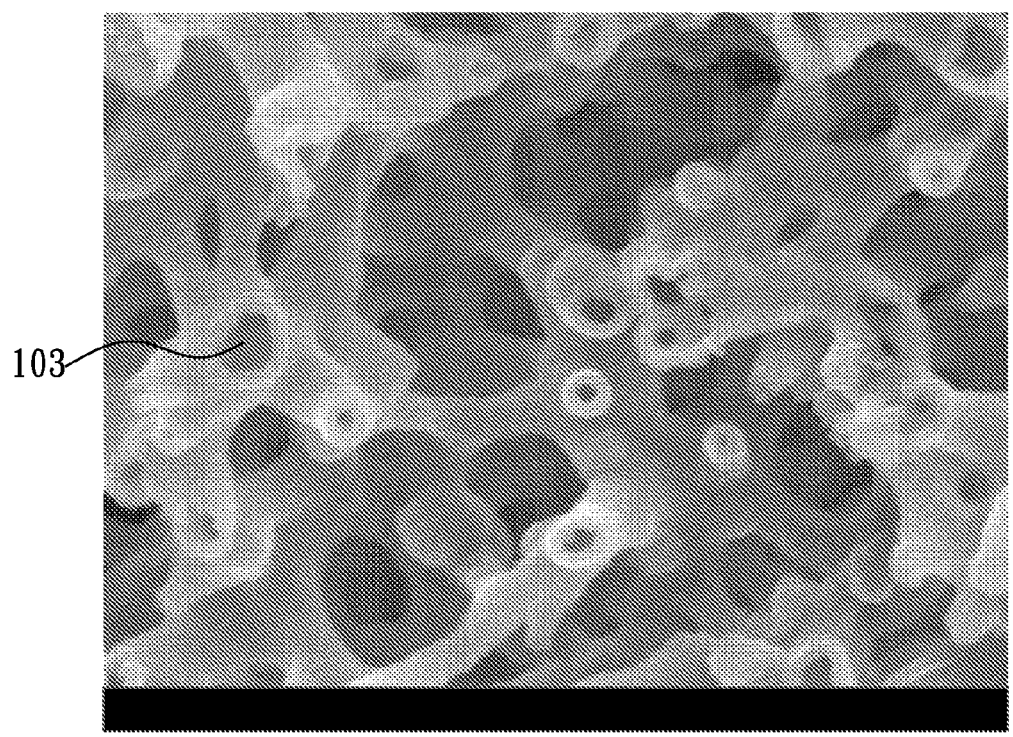

In reference to FIGS. 8A-8D, images of Scanning Electron Microscope (SEM) for a hierarchical zinc oxide nanotube prepared in embodiment 3 is provided. The method disclosed in this embodiment is identical as that disclosed in embodiment 1. The difference between them is merely that the inorganic material layer of the present embodiment is zinc oxide. It will be understood from FIG. 8 that the hierarchical zinc oxide nanotube of the present embodiment has three types of mesoporous nanochannel structure. FIG. 8B, FIG. 8C, FIG. 8D each shows the first nanochannel 101, second nanochannel 102, and third nanochannel 103.

Embodiment 4 Reaction Unit Apparatus

Figure 9:
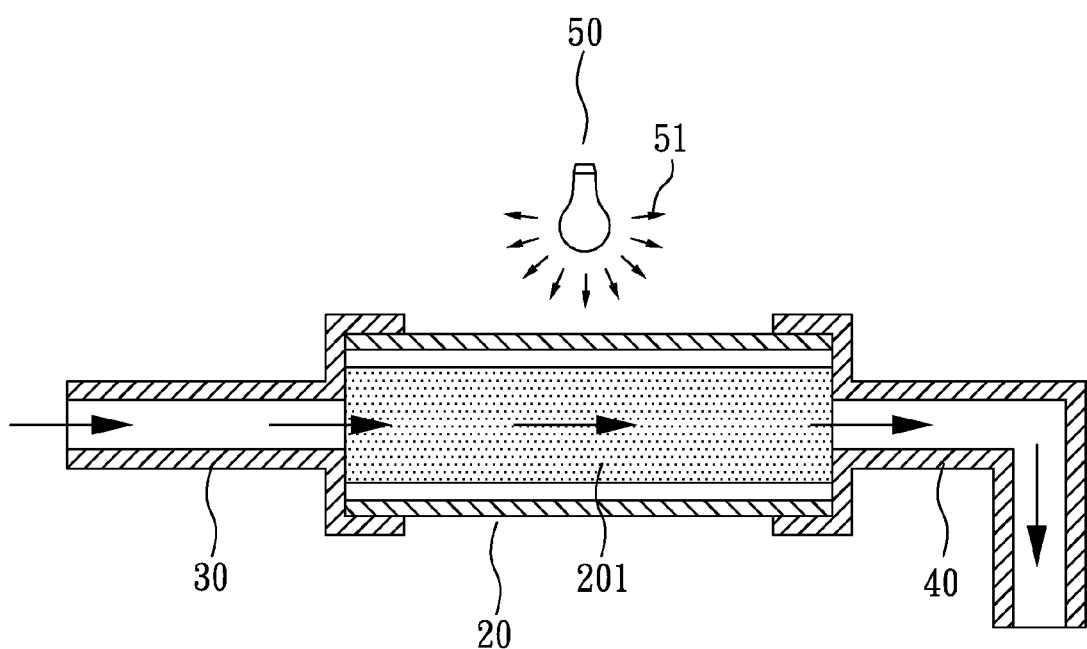
FIG. 9 shows a schematic drawing of a reaction unit apparatus.

Referring now to FIG. 9, a reaction unit apparatus is provided, comprising: a reaction chamber 20, wherein the reaction chamber has at least one hierarchical structured nanotube 201; at least one inlet 30 connecting with the reaction chamber 20; at least one outlet 40 connecting with the reaction chamber 20; and a light source 50, which provides a light beam 51 to shine onto the hierarchical structured nanotube 201, the light source 50 can be a source providing visible light (wavelength of the light beam 51 can be 400 nm-700 nm). In this embodiment, a fluid enters into the reaction unit apparatus 20 through the inlet, engages in a reaction with at least one hierarchical structured nanotube 201, and discharges through the outlet 40.

The at least one hierarchical structured nanotube described above may include a plurality of interconnecting nanotubes, which together form a three-dimensional multi-dendrite morphology, wherein the cross-diameter is 1 nm-5 µm, the constituting material of the nanotube is titanium oxide of a metal oxide. The nanotube is doped with oxygen, sulfur, carbon and other organic elements. By doping with organic elements, a visible-light-absorbing and UV-light-absorbing hierarchical structured nanotube may be formed. In an embodiment of the reaction unit apparatus, a material constituting the nanotube is $TiO_2S_{0.013}O_{2.89}N_{0.05}C_{6.29}$, and the thickness of the titanium oxide nanotube is 1 nm-1 μm. Within the above embodiment, the surface of the nanotube further includes a pluratlity of catalyst particles.

Embodiment 5 Hierarchical Titanium Oxide Nanotube (Comprising Polymeric Nanowire)

Figure 10:
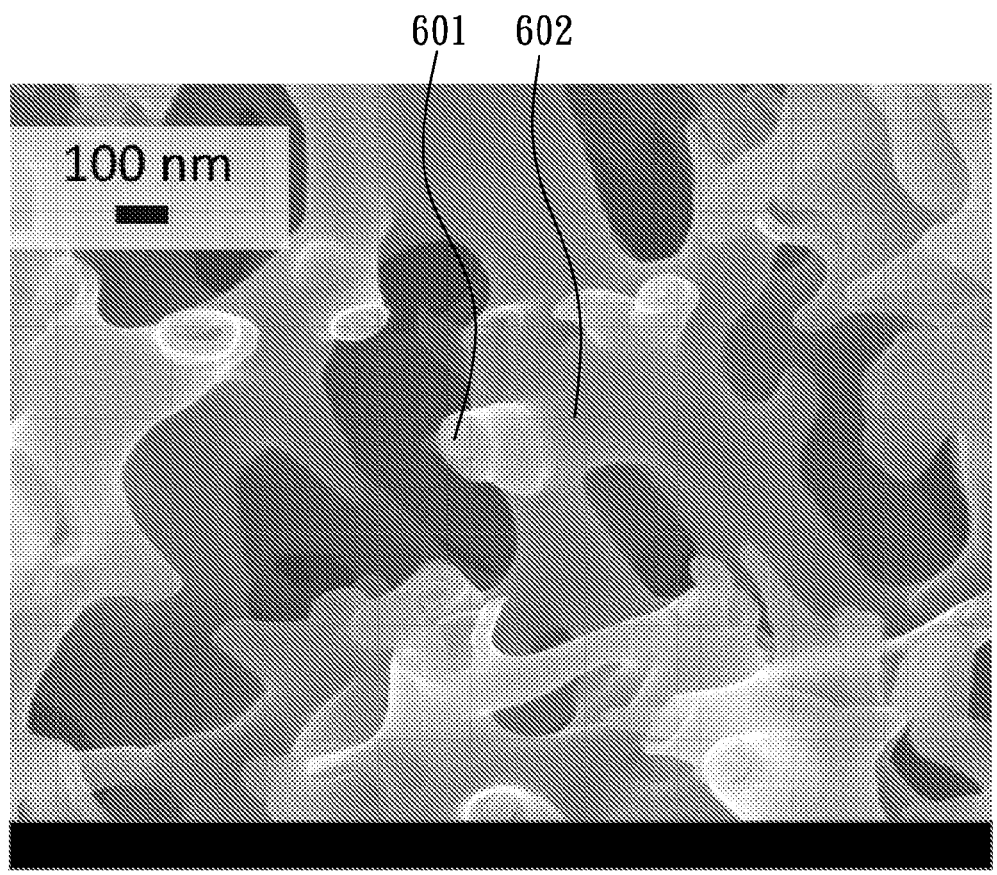
FIG. 10 shows a Scanning Electron Microscope (SEM) image for hierarchical structured titanium oxide nanotube (comprising polymeric nanowires) prepared in embodiment 5.

FIG. 10 shows images of SEM for a hierarchical titanium oxide nanotube prepared in embodiment 5. The method disclosed in this embodiment is identical as that disclosed in embodiment 1. The difference between them is merely that the thermal heating temperature is controlled to be at 50 ~300° C., thereby allowing organic polymeric nanowires 601 be maintained in the titanium oxide layer 602 in most cases, without becoming subject to total calcination to disappear, and a minority of atoms (oxygen, sulfur, nitrogen and carbon etc.) will in turn enter into the inorganic material layer, wherefore, the plurality of interconnecting nanotubes can further include polymeric nanowires, serving to function as a weight support for the nanotube of the present invention, making the hierarchical structured nanotube more structurally stable, insusceptible to breakage.

Embodiment 6 Hierarchical Titanium Oxide Nanotube (Comprising Polymeric Nanowire)

Figure 11:
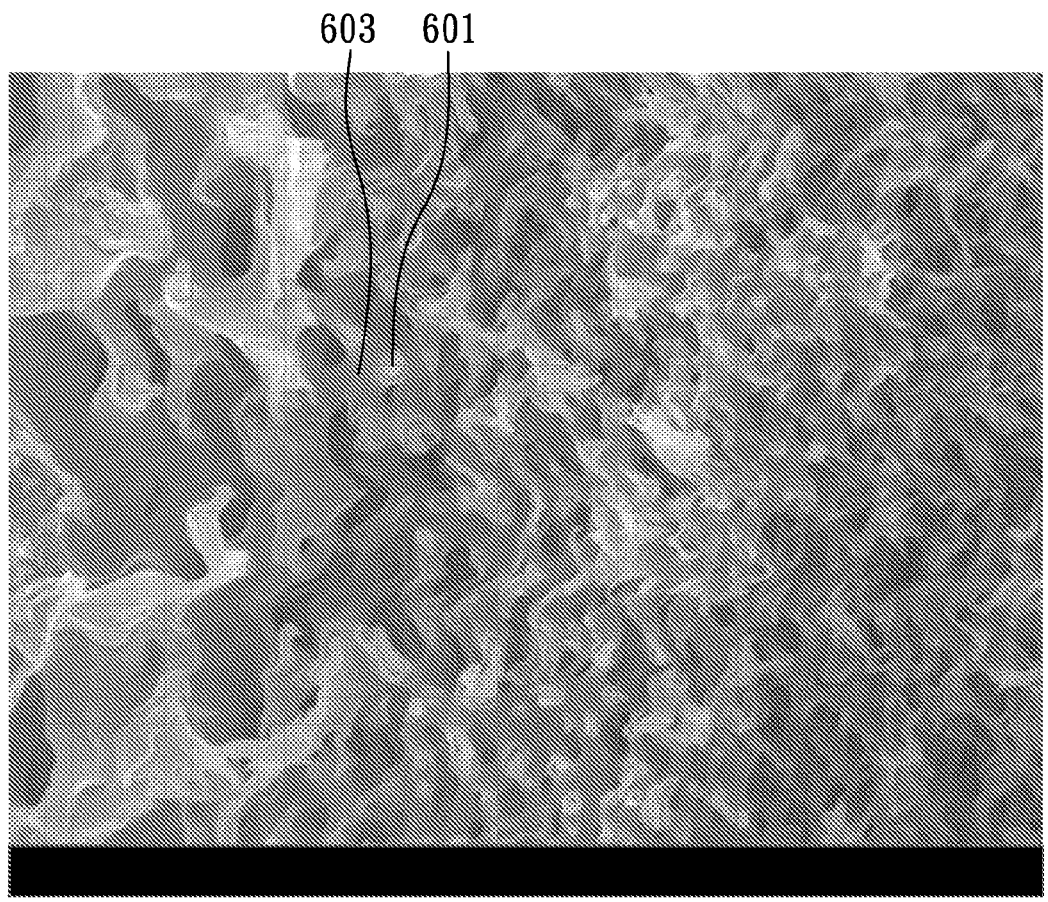
FIG. 11 shows a Scanning Electron Microscope (SEM) image for hierarchical structured aluminum oxide nanotube (comprising polymeric nanowires) prepared in embodiment 6.

With reference now to FIG. 11, a SEM micrograph of the hierarchical aluminum oxide nanotube is presented. This embodiment is identical to the preparation method of embodiment 5. The difference herebetween is that the inorganic material layer of this embodiment is aluminum oxide. The inorganic polymeric nanowire 601 can largely be maintained within the aluminum oxide layer 603 (i.e. inorganic layer), and will not disappear from complete sintering, while a minority of atoms (oxygen, sulfur, and carbon, etc.) will enter the inorganic material layer. Accordingly, the organic polymeric nanowire 601 can be used as a support for the hierarchical structured aluminum oxide nanotube, enhancing the integrity of the nanotube.

Therefore, the present invention compounds organic fiber and inogranic oxide to synthesize a hierarchical (structured) mesoporous structure nanotube, so as to formulate a plurality of passage channels of nanoscale structure, and further add on to the nanotubes' passage channel length and surface area. In addition, the high thermal stability grands the hierarchical structured nanotube capability to withstand a temperature of as high as 1000° C., and features high hydroaffinity, acidity and alkalinity resistance, errosion resistance, and UV resistance, with all demonstrating superior results than nanotube prepared by the prior arts. Furthermore, the hierarchical structured nanotube of the present invention includes organic materials doped into as-deposited inorganic oxides, which include elements such as sulfur, oxygen, nitrogen, and carbon, etc., making it possible to use visible light for materials to absorb while at the same time extend beyond the convention of using UV light irradiation on the nanotube as a means to activate the hollow mesoporous nanotube. Further yet, the hierarchical nanotube can be used in a reaction apparatus, and can also allow photodegradation, to achieve water purification purposes.

Although the present invention has been explained in relation to its preferred embodiment, it is to be understood that many other possible modifications and variations can be made without departing from the spirit and scope of the invention as hereinafter claimed.

LIST OF REFERENCE NUMERALS

10 Nanotube
101 First nanochannel
102 Second nanochannel
103 Third nanochannel
11 Platinum catalyst particle
20 Reaction chamber
201 Hierarchical structured nanotube
30 Inlet
40 Outlet
50 Light source
601 Organic polymeric nanowire
602 Titanium oxide layer
603 Aluminum oxide layer

What is claimed is:

1. A hierarchical structured nanotube, comprising:
   a plurality of interconnecting nanotubes for constituting a three-dimensional multi-dendrite morphology, wherein the cross-sectional diameter of each of said nanotube is from about 1 nm-5 μm;
   said nanotube is made by a material selected from the group consisting of metal oxide, semiconductor material, metal, ceramic, and any combinations thereof; and
   said nanotube is doped with at least one element selected from the group consisting of oxygen, sulfur, carbon, nitrogen, silicon, selenium, phosphorous, fluorine, chlorine, and any combination thereof.

2. The hierarchical structured nanotube according to claim 1, wherein said plurality of interconnecting nanotubes further comprises a nanowire.

3. The hierarchical structured nanotube according to claim 2, wherein said nanowire is made by a material selected from the group consisting of a copolymer of polysulfone and polyvinylpyrrolidone, polysulfone, polytetrafluorcethylene, polyoxybenzylene, polyphenylene sulfide, polyarylate, and any combination thereof.

4. The hierarchical structured nanotube according to claim 1, wherein said nanotube is a visible-light-absorbing and ultraviolet-light-absorbing nanotube.

5. The hierarchical structured nanotube according to claim 1, wherein a chemical composition of the nanotube is represented by the following general formula (1):

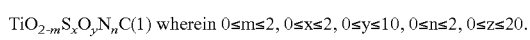

$$TiO_{2-m}S_xO_yN_nC(1) \text{ wherein } 0 \leq m \leq 2, 0 \leq x \leq 2, 0 \leq y \leq 10, 0 \leq n \leq 2, 0 \leq z \leq 20.$$

6. The hierarchical structured nanotube according to claim 5, wherein the formula (1) is $TiO_2S_{0.013}O_{2.89}N_{0.05}C_{6.29}$.

7. The hierarchical structured nanotube according to claim 1, wherein the thickness of the nanotube is of from about 1 nm - 1 μm.

8. The hierarchical structured nanotube according to claim 1, wherein the metal oxide is selected from a group consisting of titanium oxide, aluminum oxide, zinc oxide, silicon oxide, cupric oxide, nickel oxide, ferric oxide, cobalt oxide, tin oxide, gallium oxide, germanium oxide, and any combination thereof.

9. The hierarchical structured nanotube according to claim 1, wherein the exterior surface of the nanotube further comprises a plurality of catalyst particles.

10. The hierarchical structure nanotube according to claim 9, wherein the catalyst particle is selected from a group consisting of platinum, rhodium, silver, gold, iron, cobalt, nickel, copper, manganese, and palladium.

11. A method for manufacturing a hierarchical structured nanotube, comprising the steps of:
   (A) providing a polymeric template wherein the polymeric template includes a plurality of organic polymeric nanowires;
   (B) forming an inorganic layer over a surface of the plurality of organic polymeric nanowires of the polymeric template; and (C) thermal heating the surface to form the polymeric template having the inorganic layer so as to permit a portion of atoms of the organic polymeric nanowire to migrate into the inorganic layer.

12. The method according to claim 11, wherein the thermal treating in step (C) is to remove the plurality of organic polymeric nanowires of the polymeric template, and reveal the inorganic layer.

13. The method according to claim 11, wherein said nanowire is made by a material selected from the group consisting of a copolymer of polysulfone and polyvinylpyrrolidone, polysulfone, polytetrafluorcethylene, polyoxybenzylene, polyphenylene sulfide, polyarylate, and any combination thereof.

14. The method according to claim 11, wherein the inorganic layer in step (B) is formed over the surface of the plurality of organic polymeric nanowires of the polymeric template through use of atomic layer deposition (ALD).

15. The method according to claim 11, wherein the inorganic layer in step (B) is comprised of a material selected from the group consisting of metal oxide, semiconductor material, metal, ceramic, or any combination thereof.

16. The method according to claim 15, wherein the metal oxide is selected from the group consisting of titanium oxide, aluminum oxide, zinc oxide, silicon oxide, cupric oxide, nickel oxide, ferric oxide, cobalt oxide, tin oxide, gallium oxide, germanium oxide, and any combination thereof.

17. The method according to claim 11 wherein the thickness of the inorganic layer in step (B) is of from about 1 nm - 1 µm.

18. The method according to claim 11 further comprising a step (A 1) following the step (A), wherein the step (A1) comprises executing surface modification on the polymeric template so as to render the plurality of organic polymeric nanowires of the polymeric template hydrophilic.

19. The method according to claim 11 wherein the thermal heating in step (C) is at from about 50° C. - 1600° C.

20. The method according to claim 11 wherein the thermal heating in step (C) is for from about 1 minute to about 240 minutes.

21. The method according to claim 11 wherein the portion of atoms is selected from the group consisting of oxygen, sulfur, carbon, nitrogen, silicon, selenium, phosphorous, fluorine, chlorine , and any combination thereof.

22. The method according to claim 11 wherein following the thermal heating in step (C), the revealed inorganic material layer presents a structure defined by a plurality of interconnecting nanotubes, and the cross-diameter of the nanotube is 1 nm - 5 µm.

23. The method according to claim 11, wherein following step (C), further comprising a step (D): forming a plurality of catalyst particles on a surface of the inorganic material layer.

24. The method according to claim 23, wherein the catalyst particles are selected from a group consisting of platinum, rhodium, silver, gold, iron, cobalt, nickel, copper, manganese, and palladium.

25. A reaction unit apparatus, comprising:
a reaction chamber, wherein the reaction chamber has at least one hierarchical structured nanotube;
at least one inlet connecting with the reaction chamber; and
at least one outlet connecting with the reaction chamber;
wherein, a fluid enters into the reaction unit apparatus through the inlet, engages in a reaction with at least one hierarchical structured nanotube, and discharges through the outlet;
the hierarchical structured nanotube comprises a plurality of interconnecting nanotubes for constituting a 5 three-dimensional multi-dendrite morphology, wherein the cross-sectional diameter of each of said nanotube is from about 1 nm-5 µm;
said nanotube is made by a material selected from the group consisting of metal oxide, semiconductor material, metal, ceramic, and any combinations thereof; and
said nanotube is doped with at least one element selected from the group consisting of oxygen, sulfur, carbon, nitrogen, silicon, selenium, phosphorous, fluorine, chlorine, and any combination thereof.

26. The reaction unit apparatus according to claim 25 further comprising at least one light source for providing a light to shine on the hierarchical structured nanotube.

27. The reaction unit apparatus according to claim 26, wherein the hierarchical structured nanotube is a visible-light-absorbing and UV-light-absorbing hierarchical structured nanotube.

28. The reaction unit apparatus according to claim 26, wherein the wavelength of the light spectrum is between 400 nm-700 nm.

29. The reaction unit apparatus according to claim 25, wherein a chemical composition of the nanotube is represented by the following general formula (1):

$$TiO_{2-m}S_xO_yN_nC (1) \text{ wherein } 0 \leq m \leq 2, 0 \leq x \leq 2, 0 \leq y \leq 10, 0 \leq n \leq 2, 0 \leq z \leq 20.$$

30. The reaction unit apparatus according to claim 29, wherein the formula (1) is $TiO_2S_{0.013}O_{2.89}N_{0.05}C_{6.29}$.

31. The reaction unit apparatus according to claim 25, wherein the thickness of the nanotube is 1 nm - 1 µm.

32. The reaction unit apparatus according to claim 25, wherein the metal oxide is selected from a group consisting of titanium oxide, aluminum oxide, zinc oxide, silicon oxide, cupric oxide, nickel oxide, ferric oxide, cobalt oxide, tin oxide, gallium oxide, germanium oxide, and any combination thereof.

33. The reaction unit apparatus according to claim 25 further comprising a plurality of catalyst particles disposed over a surface of the nanotube, the catalyst particle is selected from a group consisting of platinum, rhodium, silver, gold, iron, cobalt, nickel, copper, manganese, and palladium.

34. The reaction unit apparatus according to claim 25, wherein said plurality of interconnecting nanotubes includes a nanowire.

35. The reaction unit apparatus according to claim 34, wherein said nanowire is made by a material selected from the group consisting of a copolymer of polysulfone and polyvinylpyrrolidone, polysulfone, polytetrafluorcethylene, polyoxybenzylene, polyphenylene sulfide, polyarylate, and any combination thereof.

* * * * *